United States Patent [19]

Bockmann et al.

[11] 3,840,383
[45] Oct. 8, 1974

[54] COLORED INORGANIC PIGMENTS

[75] Inventors: August Bockmann; Peter Kresse, both of Krefeld; Hans Rudolph, Krefeld-Bockum; Helmut Printzen, Krefled, all of Germany

[73] Assignee: Bayer Aktiengesellschaft, Leverkusen, Germany

[22] Filed: Jan. 9, 1973

[21] Appl. No.: 322,263

[30] Foreign Application Priority Data
Jan. 20, 1972  Germany............................ 2202527

[52] U.S. Cl................................ 106/308 N, 106/304
[51] Int. Cl............................ C09c 1/24, C09c 3/02
[58] Field of Search......................... 106/308 N, 304

[56] References Cited
UNITED STATES PATENTS
2,971,922  2/1961  Clem................................... 106/308
3,549,396  12/1970  Dietz................................... 106/300
3,560,430  2/1971  Meyer et al........................... 260/37

Primary Examiner—Delbert E. Gantz
Assistant Examiner—John P. Sheehan
Attorney, Agent, or Firm—Burgess, Dinklage & Sprung

[57] ABSTRACT

A flocculation-stable colored inorganic pigment exhibiting good resistance to corrosion admixed with about 0.05 to 3 percent by weight of an N,N'-diacyl diamine of the formula

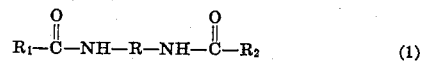

in which
R is an alkylene radical of from 2 to 10 carbon atoms;
$R_1$ is a hydrogen atom or an alkyl radical with from 1 to 6 carbon atoms; and
$R_2$ is a hydrogen atom or an alkyl radical with from 1 to 6 carbon atoms.

4 Claims, No Drawings

COLORED INORGANIC PIGMENTS

This invention relates to flocculation-stable colored pigments which exhibit good resistance to corrosion.

It is known that inorganic pigments can be aftertreated with inorganic or organic substances in order to improve their properties for particular fields of application. For example, the dispersibility in plastics of certain pigments can be promoted by an aftertreatment with an agent containing aluminum oxide. Aftertreatment with a mixture of soybean phosphatides and inosite phosphatides (U.S. Pat. Specification No. 3,017,282) makes it possible to produce iron oxides which have improved resistance to corrosion. Unfortunately, pigments which have been treated in this way are not stable to flocculation.

After dispersion in a lacquer or in a dispersion dye, colored inorganic pigments often show a tendency to re-agglomerate into relatively large aggregates. This phenomenon, known as flocculation, alters and adversely affects the color, covering power and luster of the pigments. The fact that a pigment is in a high degree of dispersion does not necessarily imply that it has a high flocculation stability. Thoroughly dispersed pigment particles can collide with one another and form so-called flocculates. Flocculation is essentially a dynamic phenomenon arising from the interplay between the attractive forces of certain dispersed particles and the random movement of the molecules in the liquid phase due to Brownian motion (G. D. Parfitt, Dispersion of powders in liquids, 1969, page 165, Elsevier Publishing Company Limited, Amsterdam, London, New York).

It is an object of the present invention to produce inorganic pigments in which the tendency to agglomeration is very much reduced or completely eliminated. It is a further object of the invention to provide pigments which can be universally used, i.e., in aqueous or organic binder systems.

These and other objects and advantages are realized in accordance with the present invention pursuant to which there are provided flocculation-stable inorganic colored pigments which exhibit good resistance to corrosion and which contain surface-active substances, the surface-active substances being N,N'-diacyldiamines.

The N,N'-diacyldiamines have the following formula (I):

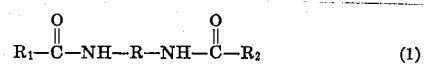

$$R_1-\overset{O}{\underset{\|}{C}}-NH-R-NH-\overset{O}{\underset{\|}{C}}-R_2 \qquad (1)$$

in which
R is an alkylene radical of from 2 to 10 carbon atoms, such as ethylene, 1,2-propylene, hexamethylene or isophoronylene;
$R_1$ is a hydrogen atom or an alkyl radical with from 1 to 6 carbon atoms, such as methyl, ethyl, propyl or butyl; and $R_2$ is a hydrogen atom or an alkyl radical with from 1 to 6 carbon atoms, such as methyl, ethyl, propyl or butyl.

The compounds of formula (1) and methods for their production are known (cf. Beilstein Vol 4, 3rd Supp. Vol. Page 602).

The following are examples of the compounds which may be used in accordance with the invention:
N,N'-diformyl-1,4-tetramethylene diamine
N,N'-diformyl-1,6-hexamethylene diamine
N,N'-diacetyl-1,2-ethylene diamine
N,N'-diacetyl-1,6-hexamethylene diamine
N,N'-dibutyryl-1,2-ethylene diamine
N,N'-dibutyril-1,6-hexamethylene diamine
N,N'-diformyl isophoronlene diamine
N,N'-diacetyl-1,2-propylene diamine
N,N'-diformyl alkylene diamines are advantageously used, N,N'-diformyl- 1,6-hexamethylene diamine, being particularly preferred.

The compounds used in accordance with the invention are employed either in the form of pure substances or in the form of mixtures thereof in quantities of about 3.0 percent by weight to 0.05 percent by weight, preferably about 1.0 percent by weight to 0.1 percent by weight, based on the dry pigment.

Measured addition to the pigment of the substances used in accordance with the invention does not present any difficulties because these substances are readily grindable, fusible or soluble. Accordingly, measured addition can be carried out in pulverized solid form or in the melt or even in the presence of a solvent or emulsifier.

The stage during production of the pigment at which the agent used in accordance with the invention are added to the pigment is not critical.

Treatment can be carried out by adding the organic substance in solid form or in the melt, in solution or in emulsion to the untreated or, optionally, inorganically aftertreated pigment before or during the final grinding operation, for example in a disc-attrition mill, ball mill, bowl mill or jet mill.

A further possibility of treating the pigments is to admix the substance used in accordance with the invention with the pigment following its preparation.

The process can be applied to any inorganic colored pigments. Particularly advantageous results are obtained with iron oxides such as iron oxide red, iron oxide black, iron oxide brown or iron oxide yellow, with chromium oxide green, cadmium yellow or cadmium red, or with mixedphase pigments such as rutile pigments, for example, nickel antimony rutile yellow or with cobalt pigments.

In addition to outstanding color stability, pigments treated in accordance with the invention show outstanding luster. They also show favorable corrosion properties.

They are eminently suitable for working into high-quality industrial lacquers and primers, for example those based on polyesters or polyurethanes.

The flocculation properties in synthetic-resin carriers were tested by a chromatography test and by the so-called rub-out test. Corrosion behavior was tested by the saltspray test. The change of color was tested by visually comparing spray-applied lacquers produced from the pigments aftertreated in accordance with the invention and from pigments that had not been aftertreated. The rub-out test is also informative in this respect. Chromatography test and rub-out test:

In the chromatography test, the flocculation properties are determined by immersing chromatography paper in the lacquer to be investigated. If the pigment present in the lacquer is flocculated only the binder rises into the paper. If no flocculation occurs, the pigment also diffuses into the paper (cf. Farbe und Lacke 76, 351 – 358 1970).

The rub-out test is a test normally used in the lacquer industry and enables flocculation behavior to be further tested. In this test, the pigment to be investigated is thinly applied in a suitable binder to a glass plate. The lacquer on the glass plate is rubbed with the finger when still moist. If the pigment is flocculated, the flocculates are destroyed by shearing during the rubbing, the color changing by comparison with the unrubbed surface.

Table 1 below sets out the results of the tests and comparison tests carried out in accordance with the chromatography test and the rub-out test. A long-oil alkyd resin and a middle-oil alkyd resin were used as binders.

Table 1

| Iron oxide red pigment | in long-oil alkyd resin | in middle-oil alkyd resin |
| --- | --- | --- |
| Not aftertreated | flocculated | flocculated |
| Aftertreated with 0.5 % by weight of N,N'-(diformyl)-hexamethylene diamine | not flocculated | not flocculated |
| 1.0 % by weight of N,N'-(diformyl)-hexamethylene diamine | not flocculated | not flocculated |
| 0.5 % by weight of N,N'-(diformyl)-tetramethylene diamine | not flocculated | not flocculated |
| 1.0 % by weight of N,N'-(diformyl)-tetramethylene diamine | not flocculated | not flocculated |

Salt-spray test:

Corrosion behavior was tested by the salt-spray test on deep drawn plates and bonderised plates. Primers based on a standard styrenized alkyd resin containing the pigment to be investigated were applied to these plates and dried. Testing was carried out by comparison with an untreated pigment in accordance with ASTM S 117-64 and DIN 50021.

The resistance to corrosion is based on a visual assessment of a change in the color of the plates after they had been treated by the salt-spray test. Marks of 1 to 5 were given to the test specimens: 1 = very good or substantially no color change; 2 = good; 3 = satisfactory; 4 = adequate; 5 = inadequate. After some practice, the test gives highly reproducible results.

The results of the tests and comparison tests are set out in Table 2.

Table 2

| Pigment: iron oxide red pigment | Mark |
| --- | --- |
| not aftertreated | 4 |
| aftertreated with: | |
| 0.5 % by weight of N,N'-(diformyl)-hexamethylene diamine | 1 |
| 1.0 % by weight of N,N'-(diformyl)-hexamethylene diamine | 2 |

Table 2 — Continued

| 0.5 % | by weight of N,N'-(diformyl)-tetramethylene diamine | 2 |
| --- | --- | --- |
| 1.0 % | by weight of N,N'-(diformyl)-tetramethylene diamine | 2 |

It will be appreciated that the instant specification and examples are set forth by way of illustration and not limitation and that various modifications and changes may be made without departing from the spirit and scope of the present invention.

What is claimed is:

1. A flocculation-stable colored iron-oxide pigment exhibiting a good resistance to corrosion admixed with about 0.05 to 3 percent by weight of an N,N'-diacyl diamine of the formula

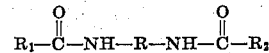

in which

R is an alkylene radical of from 2 to 10 carbon atoms;

$R_1$ is a hydrogen atom or an alkyl radical with from 1 to 6 carbon atoms; and $R_2$ is a hydrogen atom or an alkyl radical with from 1 to 6 carbon atoms.

2. A flocculation-stable colored iron-oxide pigment according to claim 1 admixed with about 0.1 to 1 percent by weight of the N,N'-diacyl diamine.

3. A pigment according to claim 2 dispersed in an industrial lacquer or primer.

4. A process for the production of a flocculation-stable colored iron oxide pigment exhibiting good resistance to corrosion comprising admixing an iron oxide pigment with a solid, a melt, solution or emulsion of 0.05 to 3 percent by weight of at least one N,N'-diacyl diamine of the formula

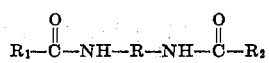

in which

R is an alkylene radical of from 2 to 10 carbon atoms;

$R_1$ is a hydrogen atom or an alkyl radical with from 1 to 6 carbon atoms; and $R_2$ is a hydrogen atom or an alkyl radical with from 1 to 6 carbon atoms.

* * * * *